Patented Sept. 4, 1928.

1,683,198

UNITED STATES PATENT OFFICE.

JACQUES LEFRANC, OF PARIS, FRANCE, ASSIGNOR TO SOCIETE DES BREVETS ETRANGERS LEFRANC & CIE., OF PARIS, FRANCE.

PROCESS FOR THE EXTRACTION OF BUTYRIC ACID AND ITS HOMOLOGUES.

No Drawing. Application filed January 25. 1927, Serial No. 163,571, and in France August 27, 1926.

The invention relates to a process for the extraction of butyric acid from calcium butyrate, and more generally of the aliphatic acids from their alkali and alkali-earth salts, and has for its object to provide a process which will provide for a ready, simple, efficient and economical extraction of the acid, at a commercial concentration or even at a greater concentration, although dispensing with the usual expensive concentration step.

The present process is based upon the insolubility of aliphatic acids in general and butyric acid in particular in a solution of alkali or alkali earth chlorides and chiefly calcium chloride; due to this insolubility the major part and, in some cases, almost the whole amount (generally about 75 per cent) of the aliphatic acids may be recovered at a suitable concentration. The insolubility of aliphatic acids in alkali or alkali earth chlorides is however not complete but it varies according to the concentration of the chloride solution, the temperature, and other factors. Obviously, the proper measures will be taken in order that the insolubility shall be a maximum.

If commercial hydrochloric acid is caused to react upon industrial calcium butyrate obtained for instance by the fermentation process, the butyrate being in slight excess, the reaction may be represented by the formula:

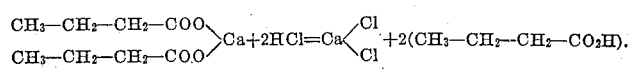

The calcium chloride thus formed dissolves in the water of solution of the hydrochloric acid and in the combined or hygroscopic water of the calcium butyrate. The concentration of the chloride may vary according to the moisture of the salt and the concentration of the acid, from 50 to 75 parts of calcium chloride for 100 parts water.

It is observed that the products of the reaction if allowed to stand will separate into two very distinct layers.

The upper layer, which may be readily decanted or withdrawn, contains about 75 to 100% (according to the concentration of the calcium chloride solution) of the aliphatic acids disengaged, at a concentration of 85–90 per cent.

The lower layer, which has a greater density, is composed of the calcium chloride solution at a more or less concentrated state according to the amount of water contained in the hydrochloric acid and aliphatic salt. The chloride solution retains about 25 per cent of the acids, and chiefly acetic acid.

In practice, the operation may be performed as follows:

Hydrochloric acid and the aliphatic salt are introduced into a suitable vessel or tank which is provided with a mechanical mixing or stirring device. The exact proportion is determined by calculation but the aliphatic salt should somewhat exceed the theoretical amount in order to secure the complete saturation of the hydrochloric acid. The acid may be poured upon the aliphatic salt or, optionally, the salt may be poured into the acid; the whole is then mixed in order to provide a perfect contact between the constituents of the mixture, the operation being performed at the normal temperature. When the reaction is completed, the liquid material from the tank is filtered in order to separate the substances in suspension, and chiefly to recover the excess of the aliphatic salt.

The clear solution is allowed to stand, and it divides into two distinct layers which can be readily separated by decantation, withdrawal or centrifugal process.

The upper layer contains the concentrated acids at 85–90 per cent in a greater or less proportion depending upon the concentration of the calcium chloride solution, for instance 75 to 100 per cent of the total amount of aliphatic acids for a 30 per cent calcium chloride solution.

The lower layer consists of a calcium chloride solution which contains a small proportion of acids, for instance 25 per cent thereof for a 30 per cent calcium chloride solution, these acids chiefly comprising acetic acid.

The concentrated acids are collected by decanting, centrifugation or withdrawal, and are decolored by animal black, and are then concentrated upon the usual dehydrating substances such as anhydrous sulphate of alumina or melted calcium chloride, and the said acids may then be rectified by the known methods, thus offering products having the maximum concentration.

The acids which are retained by the calcium chloride solution, may be readily removed therefrom, since the material to be treated consists of a liquid (and not of a liquid interposed within crystals). The solution of chloride having a boiling point of some 115–130 degrees C., use may be made of the method of extraction by superheated steam, for example.

This will afford a dilute solution of butyric acid which may, if desired, be mixed with the concentrated acids resulting from the decantation or the withdrawal of the upper layer, either crude or rectified, so as to bring the said acids to the suitable concentration for commercial purposes, such as 50, 60 or 70 per cent.

By way of example: 280 parts of hydrated and moist calcium butyrate obtained by the fermentation process are treated with 235 parts of ordinary hydrochloric acid; 140 parts of crude acid at 80–90 per cent are obtained; by the treatment of the chloride solution 14.5 parts more of acid are recovered; the total amount of crude acid is thus 154.5 parts for 280 parts of industrial calcium butyrate.

The dissolved hydrochloric acid will not combine with the aliphatic acids; but chlorine, and especially chlorine under the action of light, may decompose the aliphatic acids.

To obviate the action of chlorine which may be due to the presence of chlorine in the free state in the commercial acid, chlorine must be eliminated. This may be readily effected due to the great affinity of chlorine for hydrogen, and chiefly for nascent hydrogen. To eliminate the chlorine, it is thus sufficient to produce within the hydrochloric acid (and obviously before mixing it with the butyrate) a disengagement of nascent hydrogen for instance by the addition of a suitable amount of iron, zinc or other metal.

In these conditions, and since the operation is performed in the presence of an excess of an aliphatic salt which will quite saturate the whole of the hydrochloric acid in use, only the desired reaction will take place.

Having now described my invention, what I claim as new and desire to secure by Letters Patent is:

1. A process of extraction of aliphatic acids from their alkali and alkali-earth salts which consists in treating said salts with hydrochloric acid, the aliphatic salt being in slight excess, in filtering the resulting liquid whereby the excess of aliphatic salt is recovered and in separating the lower layer formed by the solution of chloride produced, from the major part of the insoluble aliphatic acids forming the upper layer.

2. A process of extraction of aliphatic acids from their alkali and alkali-earth salts which consists in treating said salts with hydrochloric acid, the aliphatic salt being in slight excess, in separating the lower layer formed by the solution of chloride produced, from the major part of the insoluble aliphatic acids forming the upper layer and in decoloring by animal black, concentrating with a dehydrating agent and rectifying the insoluble aliphatic acids.

3. A process of extraction of aliphatic acids from their alkali and alkali-earth salts which consists in treating said salts with hydrochloric acid, the aliphatic salt being in slight excess, in separating the lower layer formed by the solution of chloride produced, from the major part of the insoluble aliphatic acids forming the upper layer, and in treating the solution of chloride with steam whereby the small amount of aliphatic acids retained therein is recovered.

4. A process of extraction of aliphatic acids from their alkali and alkali-earth salts which consists in treating said salts with hydrochloric acid, the aliphatic salt being in slight excess, in separating the lower layer formed by the solution of chloride produced, from the major part of the insoluble aliphatic acids forming the upper layer, in treating the solution of chloride with steam whereby the small amount of aliphatic acids retained therein is recovered and in mixing in suitable proportion the aliphatic acids thus recovered with the aliphatic acids formerly separated.

5. A process of extraction of butyric acid from calcium butyrate which consists in treating 280 parts of hydrated and moist calcium butyrate produced by fermentation with 235 parts of hydrochloric acid of commerce and in separating by decantation the solution of calcium chloride from the insoluble butyric acid.

6. A process as claimed in claim 4 which further consists in causing the disengagement of nascent hydrogen within the hydrochloric acid before adding the same to the aliphatic salt to be treated.

In testimony whereof I have signed my name to this specification.

JACQUES LEFRANC.